April 11, 1950      E. R. G. ECKERT      2,503,250

AIR CONDITIONING APPARATUS FOR HIGH-SPEED AIRCRAFT

Filed June 2, 1948      3 Sheets-Sheet 1

INVENTOR.
ERNST R. G. ECKERT
BY Wade Kountz
ATTORNEY
Charles L. Burgoyne
AGENT

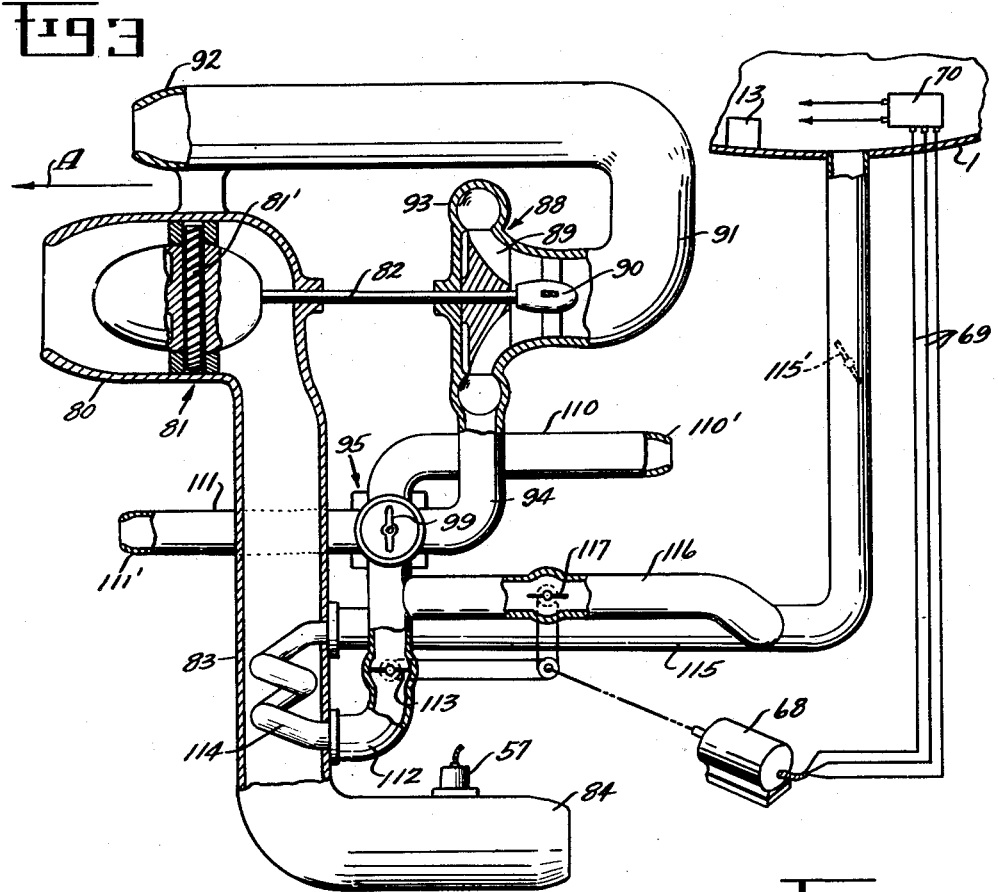

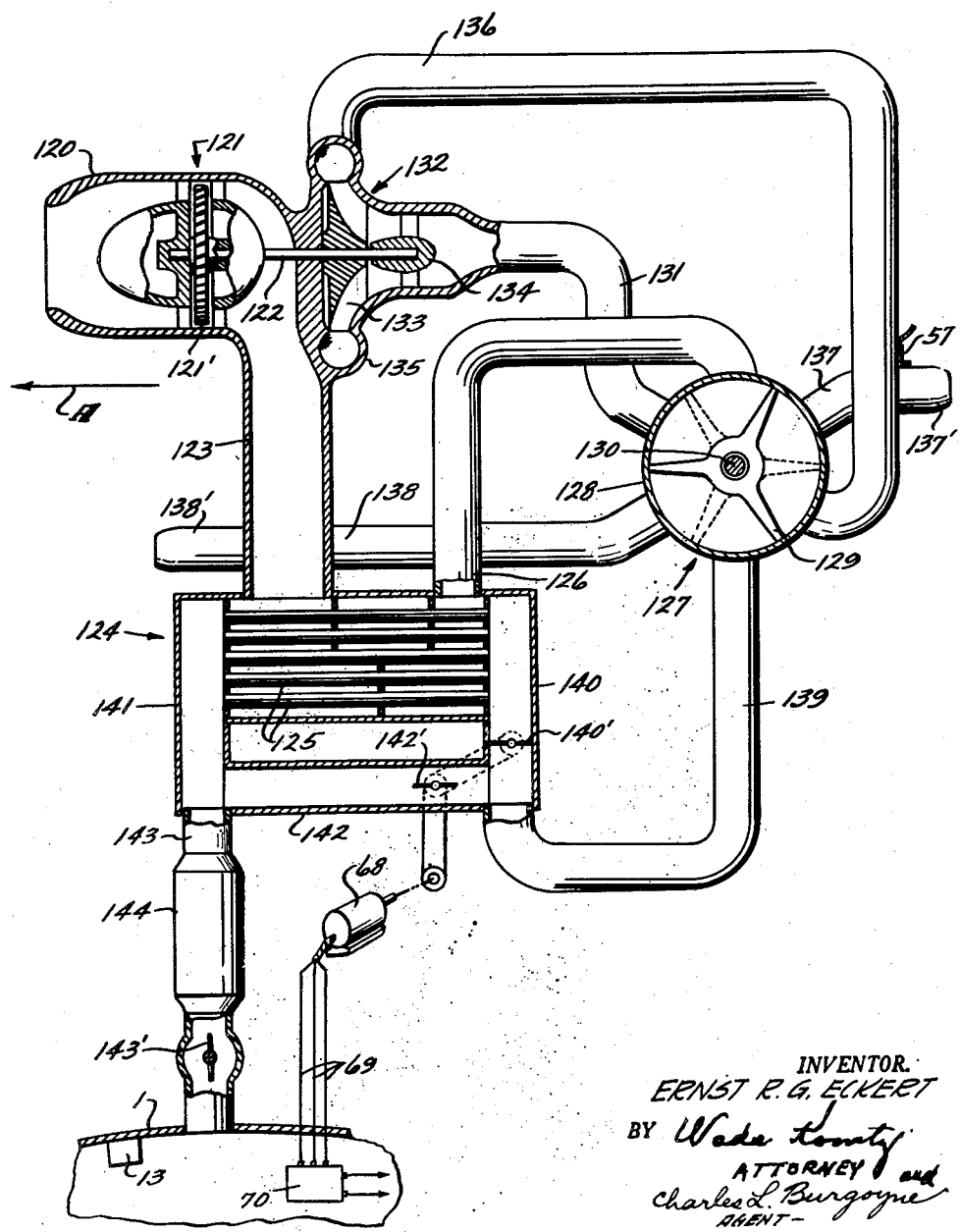

Patented Apr. 11, 1950

2,503,250

UNITED STATES PATENT OFFICE 2,503,250

AIR CONDITIONING APPARATUS FOR HIGH-SPEED AIRCRAFT

Ernst R. G. Eckert, Patterson Field, Ohio

Application June 2, 1948, Serial No. 30,712

5 Claims. (Cl. 62—136)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to the cooling of cabins or other compartments in high velocity aircraft.

The primary object of the invention is to provide apparatus for cooling and conditioning air for use in the cabins of high velocity aircraft and to provide simple and reliable control means for association with the conditioning apparatus.

A further object of the invention is to provide air conditioning apparatus for use with high velocity aircraft, wherein the conditioning apparatus may function entirely independently of the aircraft power plant or propulsion system.

A further object of the invention is to provide air conditioning apparatus for use with high velocity aircraft, wherein the forward velocity is used to build up a pressure head for obtaining power to operate the air conditioning apparatus and also to obtain a source of air having a pressure greater than atmospheric for pressurizing the aircraft cabin.

Another object of the invention is to provide improved air conditioning apparatus for use on high velocity aircraft and thus extend the versatility and field of usefulness of aircraft carried air conditioning apparatus.

Another object of the invention is to provide air conditioning apparatus for high velocity aircraft including simple control means to vary the manner of operation in order to adapt the apparatus for maintaining comfort conditions in the aircraft at all altitudes normally encountered.

The above and other objects of the invention will become apparent upon reading the following detailed description in conjunction with the drawings, in which;

Fig. 3 is a diagrammatic cross sectional view of a third form of the present cabin air conditioning apparatus.

Fig. 4 is a diagrammatic cross sectional view of a fourth form of the present cabin air conditioning apparatus.

Fig. 5 is a cross sectional view of an air valve used in the apparatus of Fig. 3.

Fig. 6 is a cross sectional view of an air safety valve preferably installed in the cabin wall to prevent over-pressurization.

In cabin air conditioning of high speed aircraft it is becoming common practice to divert a small portion of compressed air from the air compressor of a turbojet engine for use in pressurizing as well as conditioning the air for the cabin. It is of course desirable to pressurize the cabin at high altitudes in order to supply sufficient oxygen for the aircraft pilot. It is well recognized that altitudes of more than two miles above sea level do not represent sufficient oxygen concentration for the human body to function properly, and above three miles the supply of oxygen must be augmented if the body is to function at all. Cabin pressurizing accomplishes more than merely increasing the weight of available oxygen, since the increased pressure over that in the outside atmosphere has a beneficial effect in maintaining pressure equilibrium in the human body. In other words pressurizing attempts to maintain or duplicate air conditions prevailing near sea level. Furthermore cooling of the air in the cabin may be required, since the cabin tends to heat up due to air friction, radiation from the sun and heat load of various electrical and mechanical equipment. Even a radio as found on board most aircraft will impose an appreciable heat load. The present air conditioning systems for aircraft do not require a turbojet engine having an air compressor, since they will function independently of the aircraft propulsion equipment. One advantage is that the air conditioning system may be controlled more easily because it is not directly dependent on the output of the engine or turbo-compressor. However the principal advantage is that the air conditioning systems may be used on any high speed aircraft, regardless of the type of propulsion system present on the aircraft. It should be emphasized also that the cooling apparatus and pressurizing means may even find use on board pilotless aircraft, especially where equipment and fuels carried in the aircraft must be protected against adverse temperature and pressure conditions. Each of the four different embodiments of the invention have similarities and differences, and each have particular advantages or refinements which will be noted in the detailed descriptions to follow.

Figure 1:
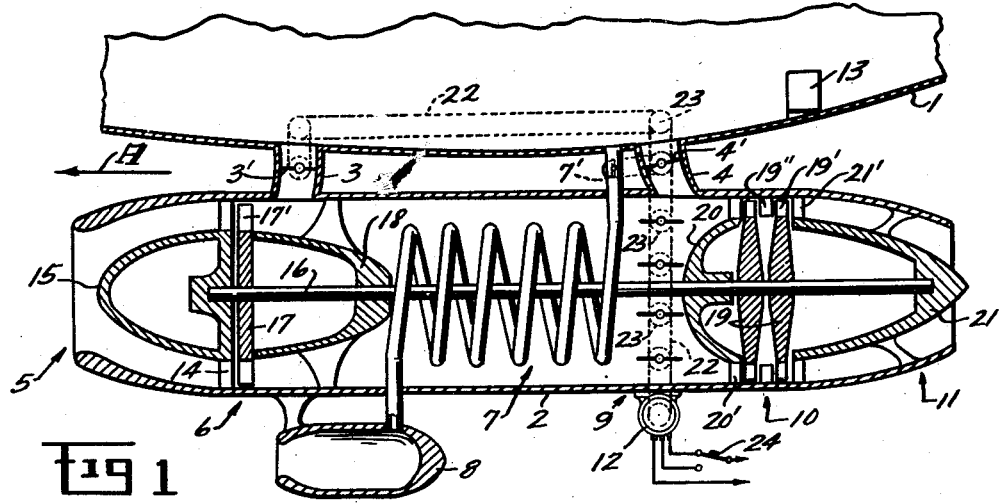
Fig. 1 is a diagrammatic cross sectional view of a simple form of the present cabin air conditioning apparatus and including a portion of the cabin itself.

Considering the system or apparatus of Fig. 1 it will be seen that a portion of an aircraft cabin or fuselage 1 carries an elongated cylindrical housing or casing 2 open at both ends for the passage of air. The housing is supported by the hollow struts 3 and 4 through which air may pass under the control of throttle valves 3' and 4'. As the aircraft moves in the direction of the arrow A the air outside the cabin enters the housing 2 at the inlet or intake 5. Rearwardly thereof the housing contains an expansion turbine 6, a cooling coil 7 receiving air from an air scoop 8, a damper valve 9, an air compressor 10 and an exhaust nozzle or tail cone 11. Mounted on the wall of the housing is a servomotor 12 for actuating the valves 3', 4', 7' and 9 in unison, with the valves positioned as shown for one extreme of their coordinated movement. The valve 7' is adapted to control the flow of high pressure air from the coil 7 into the cabin. Mounted on the wall of the cabin is a safety valve or pressure relief valve 13, shown in detail in Fig. 6.

It will be noted that the turbine 6, which is built on the expansion principle to utilize a maximum of the energy available in the air entering the inlet 5, is provided with air guide vanes 14 fixed to the housing 2 and to a central filler and bearing member 15. The member 15 provides a forward thrust bearing for shaft 16 having turbine wheel 17 fixed thereon. The wheel 17 carries turbine blades 17' arranged on its periphery to receive air from the stationary vanes 14 and thus drive the wheel 17 and shaft 16. The extraction of energy from the air compressed ahead of the open housing 2 by the ram effect, results in a marked pressure drop through the turbine and the resulting expansion of the compressed air produces a sudden cooling action because of the loss of kinetic energy in the air. The cooled air passes over the coil 7 after also passing around the central filler and bearing member 18, thus keeping the coil much cooler than the outside atmosphere. With the various air valves in the relative positions shown, the air passes through the damper valve 9 and is then compressed by the air compressor 10. As the air leaves the compressor it passes out through exhaust nozzle 11 as it expands in the tail cone rearwardly of the compressor. This expansion and free discharge rearwardly of the apparatus produces a propulsive effect helping to drive the aircraft through space. Thus it may be seen that part of the kinetic energy given up by the air in passing through the expansion turbine 6 is recovered as useful work in driving the compressor 10 through the main shaft 16.

The compressor 10 is shown by way of example as including two rotor sections 19 having blades 19' on the periphery thereof. The air is guided into the rotor sections by way of blades 20' carried on a central filler and bearing member 20. A row of stationary guide vanes 21' on the central filler and bearing member 21 serves to take out any whirling action of the compressed air leaving the rotating blades 19', since a maximum of thrust effort can only be obtained by direct axial flow of the air through and out of the tail cone. Between the separate rows of moving blades 19' there is a row of stationary guide vanes 19'' to give the air the proper direction of flow as it meets the second row of moving blades or vanes.

As the aircraft is moving forward at a rapid rate, say 600 M. P. H. or more, air is compressed within the air scoop 8 resulting in air flow through the cooling coil 7 into the aircraft cabin 1. Since the coil is cooled below the outside air temperature by air flow inside the casing 2, the air reaching the cabin by way of the cooling coil 7 will also be cooler than the ambient air and the cabin atmosphere will be cooled accordingly. At the same time the cabin air pressure is increased by the inward flow of air from the air scoop or diffusor 8. Thus the apparatus would be operating for maximum altitude conditions where definite cabin pressurizing is required and where the cabin cooling need only be moderate, it being well recognized that high altitude temperatures are much lower than those encountered below levels of 4000 to 6000 feet above sea level. As air pressure builds up within the cabin it is necessary to provide some avenue of escape, otherwise unnecessary stress would be put on the aircraft walls tending to burst the cabin at the weakest point. This air escape may take the form of a manually regulated valve, which may be set to allow escape of air at such a rate as to keep the inside air pressure at safe levels. However it is preferred to use an automatic air escape valve responsive to the pressure differential between the inside air and the outside air, since it is this differential which determines the stress on the aircraft wall structure. Such an automatic valve 13, which may be termed a safety valve, is shown in detail in Fig. 6 and will be described below.

As shown in Fig. 1 the shutter valves 7' and 9 are open and the shutter valves 3' and 4' are closed. The valves are arranged to be rotated to any desired setting by means of a series of cables or chains 22 forming continuous loops around pulleys or sprockets 23 fixed on the central shafts of the valve shutter elements. One of the cable loops extends over a pulley on the electrical servomotor 12. The motor is of a reversing type which may be controlled by a single-pole double-throw reversing switch 24 to operate the shutter valves 3', 4' and 9 to any desired setting. For example consider the valves in the opposite position relative to that shown in Fig. 1. With the valve 9 closed and valves 3' and 4' open, air can no longer pass through the casing 2 and over the cooling coil 7 but instead will pass into the cabin through the hollow strut 3 after being cooled by passage through the expansion turbine 6. Since the valve 4' is also open the air flowing into the cabin may displace other air which will flow out of the cabin by way of the hollow strut 4. Thence the air flows through the compressor 10 to provide the same propulsive thrust as described above. With air valve 4' in open position the air flow in coil 7 is blocked by means of the coupled valve 7' in the pipe leading from the coil to the cabin 1. Thus no air will be brought in from the air scoop 8 and since both valves 3' and 4' are open at the same time the cabin pressure will not increase greatly over the outside air pressure. Thus with valves 3' and 4' open and valves 7' and 9 closed there will be a minimum of cabin pressurization and a maximum of cooling effect, a condition generally desired at lower altitudes. The valves may also be set in intermediate positions to obtain conditions between the two extremes discussed above. Using cabin temperature as the governing factor the valves may be regulated automatically by a thermostatic switch in the cabin connected in the servomotor circuit in place of the switch 24. Such a thermostatic control means will be described in connection with the other three forms of the invention, since automatic control is desirable and in practice would generally be required.

For a description of one possible form of safety valve reference is now made to Fig. 6. The valve 13 comprises a cylindrical housing 30 having a securing flange 30' for use in bolting the housing to the aircraft wall W which is cut out to receive the outer end portion of the housing. The outer end wall of the housing is apertured to receive a poppet type of valve 31 having a pair of actuating rods 32 rigidly attached thereto and adapted for actuation outwardly from the position shown by a pair of levers 33. The levers 33 which are pivoted to the housing walls by means of brackets 34, are connected by links 35 to the actuating levers 36 carried on fixed pivots 37. The adjacent ends of levers 36 extend on opposite sides of a stem 38 and are connected thereto by means of pin and slot connections as shown. The stem 38 is attached directly to a diaphragm 39 which is clamped over the open inner end of the housing 30 by means of a recessed head plate 40 attached at its periphery to the housing by bolts 41. Communicating between the outside atmosphere and the space between the diaphragm and head plate is a small caliber tube 42. The housing is also provided with air holes 43 so that cabin air can pass into the housing freely and can also maintain cabin pressure on the outer side of the actuating diaphragm 39. Since the diaphragm is made somewhat flexible, it is obvious that when the air pressure inside the cabin rises substantially over that outside the cabin, the diaphragm 39 will bulge inwardly and actuate the various levers to open the poppet valve 31. With valve 31 open the higher pressure air in the cabin may pass through apertures 43 into housing 30 and thence to the outer atmosphere through valve 31. The response of the actuating diaphragm may be adjusted by properly choosing the material and dimensions of the element, and if desired its action may be stiffened by the use of springs. In any case the safety valve 13 will act to relieve excessive pressure in the cabin and prevent mechanical failure of portions of the cabin wall. Other types of safety valves may be substituted for the specific valve shown but the purpose and the response to differential pressures will still be the same.

Figure 2:
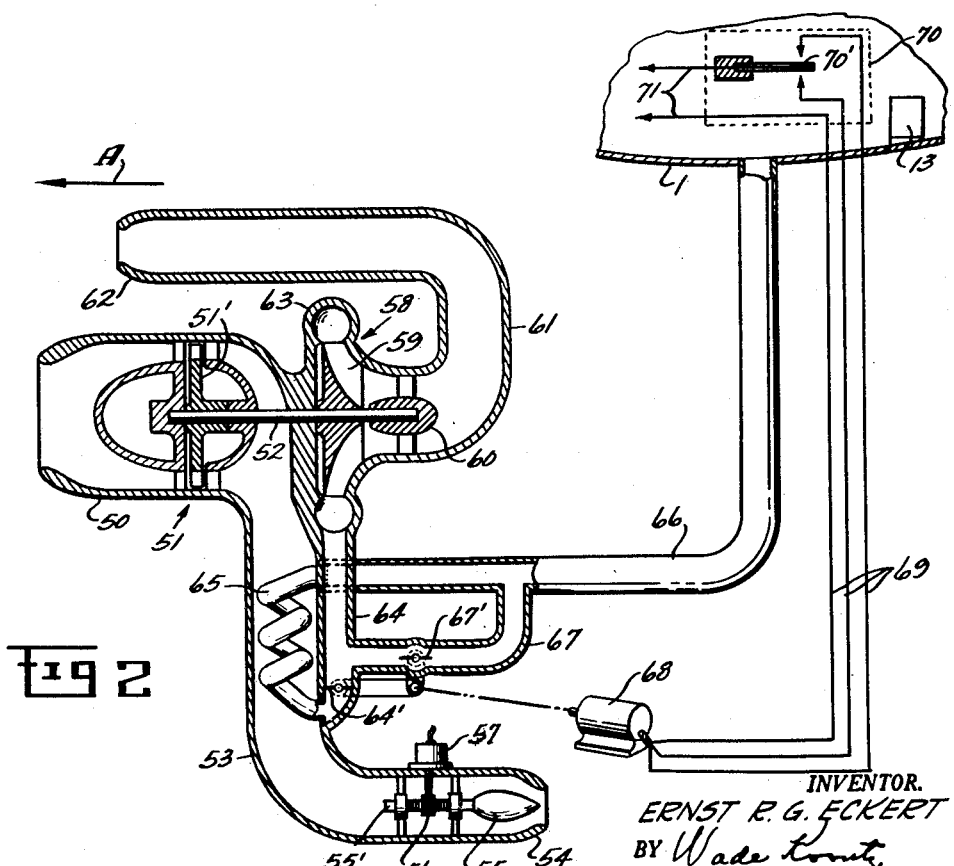
Fig. 2 is a diagrammatic cross sectional view of a second form of the present cabin air conditioning apparatus and including a portion of the cabin having a thermostatic control means therein.

The second form of air conditioning apparatus is illustrated in Fig. 2. While not shown as mounted on the cabin 1, it is understood that the apparatus would either be enclosed in a unitary casing secured outside the cabin or built into the cabin near the forward portion thereof and provided with the proper air inlets and outlets as required by the units comprising the air conditioning apparatus. The apparatus or system includes an air inlet and turbine housing 50 having an expansion turbine 51 carried centrally thereof. The turbine includes a wheel 51' mounted on a central shaft 52 having the bearing supports arranged in a manner similar to that described in connection with Fig. 1. An expansion chamber rearwardly of the turbine 51 opens into a large conduit 53 ending in an exhaust nozzle 54. In order to regulate the turbine back pressure for reasons to be explained, there is a controllable bullet or regulator 55 mounted to move axially in the exhaust nozzle. A central stem 55' on the bullet is provided with rack teeth engaged by a pinion 56 carried on the shaft of a reversible servomotor 57. By proper positioning of the bullet 55 the cross sectional area of the exhaust nozzle may be adjusted to give the desired changes in turbine back pressure. The air expanded in the turbine 51 flows freely from the conduit 53 at the exhaust nozzle 54, thus augmenting the propulsion system of the aircraft and making good use of some of the kinetic energy remaining in the air compressed ahead of the housing 50 by forward motion in the direction of arrow A.

The main shaft 52 extends rearwardly from the turbine 51 to drive an air compressor 58. The compressor, which is of the radial-flow type, includes an impeller 59 rigid with shaft 52. The rear end of shaft 52 is journaled in a central bearing 60 supported by thin struts in the compressor inlet pipe 61. The pipe 61 receives ram-compressed air from the intake 62 facing directly into the airstream. The circular or toroidal compressor manifold 63 opens into a high pressure line 64 connecting with a cooling coil 65 mounted in the conduit 53. Since the expansion turbine 51 provides rapid expansion of the high pressure air entering the housing 50, the air is cooled by passing through the turbine. The cooling coil 65 is accordingly cooled also by the passage of the expanded air thereover. The high pressure air flowing in coil 65 is cooled by transfer of heat to the coil. The coil 65 connects to the air duct 66 leading to the aircraft cabin 1. Connected between the line or pipe 64 and the duct 66 there is a bypass line 67 having a throttle valve 67' mounted therein. Also a throttle valve 64' is similarly mounted in the high pressure line 64. By means of pulleys and cables the relative setting of valves 64' and 67' may be adjusted through the medium of a reversible servomotor 68. Three leads 69 extend from the servomotor to a control thermostat 70 mounted in the aircraft cabin. Extending from the thermostat 70 are two power lines 71 connecting with a source of electric power carried on the aircraft. The heat sensitive element 70' of the thermostat is adapted to bend in opposite directions in response to increase or decrease of temperature and thus effect control of the servomotor 68, which in turn is adapted to control the temperature of air reaching the cabin 1 through the high pressure duct 66.

With the temperature control valves 64' and 67' in the positions shown, the air from compressor 58 is all routed through bypass line 67 directly into the duct 66. This air will be heated above atmospheric temperature because of the work done in compressing it in the compressor 58, not to mention the effect of ram compression ahead of the air intake 62. Therefore the apparatus will now furnish warm air to the cabin 1 under pressure. As the cabin pressure builds up, the air relief valve 13 may operate to avoid excessive pressure in the cabin as explained in the description of the valve itself (Fig. 6). The condition of warm air at pressures above atmospheric will be ideal for flight at high altitudes where outside temperatures may be below zero and barometric pressure is also quite low. The cabin will now be supercharged with warm air, making air conditions in the cabin comparable to those found at say 4000 feet above sea level. Now assuming that the aircraft seeks a lower altitude where the outside air is warmer, the cabin air will soon be warm enough to actuate the thermostat 70 and motor 68 to change the relative positions of valves 64' and 67'. With the valve 64' open partly and valve 67' closed partly, the compressed air in line 64 will flow both through the cooling coil 65 and bypass line 67 in a definite quantity relation. The resulting flow of cabin air in duct 66 will be at a lower temperature than in the example first given, thus lowering the temperature in the cabin and actuating thermostat 70 to the Off position shown. It may be seen that the two control valves 64' and 67' are capable of proportioning the flow of warm and cold air to match any desired temperature condition in the cabin 1 within reasonable limits.

Since the flow proportioning valves 64' and 67' influence only the air temperature, it is desirable to provide other means to regulate the pressure of the air flowing in duct 66 so that the pressure may be reduced at low altitudes where atmospheric pressure is more nearly normal. For this purpose there is provided the flow regulating bullet 55 which may be set to restrict the flow of air from the exhaust nozzle 54. Any restriction increases the back pressure on the expansion turbine 51 to cause it to slow down, thus reducing the rotative speed of impeller 59 of compressor 58. The output pressure of the compressor 58 can thus be reduced and the air pressure in air duct 66 is reduced accordingly. If desired the servomotor 57 for actuating the bullet 55 may be automatically controlled by a barometric switch, responsive to the pressure of the atmosphere outside the aircraft. In practice such automatic control is usually required, since the aircraft personnel must be relieved of attention to details as far as possible.

The third form of air conditioning apparatus is illustrated in Fig. 3, and in general is similar to the form just described except that it provides more latitude in control of the air output and other characteristics. The apparatus comprises an air inlet and turbine housing 80 having an axial-flow expansion turbine 81 mounted therein, which is operated by air compressed ahead of the housing 80 as it moves through the atmosphere in the direction of the arrow A. The turbine includes a turbine wheel 81' fixed on the main shaft 82. The expanded and cooled air leaving the turbine flows into an expansion chamber and conduit 83 which terminates in an exhaust nozzle 84. The discharge area of the nozzle 84 may be adjusted by a means actuated by the servomotor 57, this portion of the apparatus being similar to the corresponding portion of the apparatus shown in Fig. 2.

The shaft 82 extends rearwardly into a radial-flow air compressor 88 having an impeller 89 carried rigidly on the shaft 82 and driven by the turbine 81. The rear end of the drive shaft 82 is supported in a central bearing 90 mounted centrally of the compressor inlet pipe 91, the latter extending forwardly to a ram air inlet 92. The manifold 93 of the compressor is connected by a high pressure air line 94, receiving the compressor output and carrying this high pressure air to a selector valve 95 (see Fig. 5). The valve 95 may take various physical forms but for illustration the structure indicated in Fig. 5 is satisfactory. The valve body 96 has a central bore 97 having a rotatable plug 98 therein which is adapted for operation by a handle or other actuator 99. Extending through the plug 98 are a pair of curved passages 100 and 101 adapted to connect adjacent pairs of valve ports 102, 103, 104 and 105. The rotatable valve plug is adapted to be set in two positions in a 90° relation, as shown, so as to connect ports 102 and 103, 104 and 105 in one position (solid lines) or to connect ports 102 and 105, 103 and 104 in the other position (broken lines). As noted in Fig. 5 the valve ports 102, 103, 104 and 105 connect with air conduits 94, 110, 111 and 112 respectively. Thus in the position of the valve as illustrated, the compressed air from compressor 88 flows from line 94 through passage 100 and into line 110 and thence out of the rearwardly extending discharge nozzle 110'. This free discharge of the compressed air will accordingly augment the thrust of the aircraft, and assist the propulsion system thereof. The conduit 111 extends forwardly to an air scoop or air inlet 111' and the air entering the conduit flows through the valve passage 101 and thence into the conduit 112 which connects with the cooling coil 114. The flow in conduit 112 is controlled by means of a valve 113. The coil 114 opens into the cabin air duct 115, provided with a control throttle valve 115'. The air conduit 112 leading to the cooling coil is connected to the cabin air duct by a bypass duct 116 having a control valve 117 therein. Thus as shown in Fig. 3 all the air entering the air inlet 111' is bypassed through conduit 116 into the cabin duct 115, this corresponding to a condition of the atmosphere where no cooling of the cabin is desired and only limited pressurization is needed. The air being compressed to some extent by the ram action of inlet 111', the air reaching the cabin will be slightly warmer than the outside air. The valve setting of Figs. 3 and 5 might correspond to desired cabin conditioning at a moderate elevation, say for example 7000 to 8000 feet above sea level on a cool day, or at night.

The control valves 113 and 117 are controlled jointly by means of pulleys and cable loops driven by an electric servomotor 68, which is thermostatically controlled by a cabin thermostat 70 as described in connection with Fig. 2. Thus the thermostat may act to proportion warm and cold air reaching the cabin air duct 115 by way of the bypass duct 116 and cooling coil 114 respectively.

Now considering the apparatus of Fig. 3 with the valve 95 set in the other position, that is the broken line position of Fig. 5, it will be seen that the compressed air flowing in line 94 will pass through valve 95 to the line 112 to form the cabin air supply while the air entering the ram inlet 111' will flow through line 111, valve 95 and exhaust line 110. This valve setting will result in a maximum of cabin pressurization and with valves 113 and 117 in the positions shown will also result in a maximum of heating effect. Thus without changing anything except the position of valve 95, the apparatus as shown in Fig. 3 will function to overcome atmospheric conditions at high altitudes, say for example at 10,000 feet above sea level or higher. However, if the sun were shining on a summer day it would probably be necessary to open the valve 113 partly and close valve 117 partly to obtain cooler air. This would occur automatically by action of the thermostat 70. Excessive pressurization may be prevented by use of the adjustable exhaust nozzle 84, since raising the turbine back pressure will slow down the turbine and connected compressor 88. It is also possible to throttle the air flow for reducing cabin pressure by the proper setting of the throttle valve 115' in the cabin air duct 115. If the cabin pressure should reach a level which would place too great a strain on the cabin walls, then the safety valve 13 would automatically operate to relieve the pressure by valving high pressure air in the cabin to the atmosphere. The exhaust nozzle 84 is made to have an adjustable cross section in the same manner as described in connection with Fig. 2, and as before the servomotor 57 may be made responsive to a barometric switch if desired.

The fourth and final form of air conditioning apparatus is illustrated in Fig. 4 and in general may be said to provide apparatus which is a composite of that shown in Figs. 2 and 3 without any needless duplication of units or components. As before the apparatus includes an air inlet and turbine housing 120 which encloses an expansion turbine 121 having a single turbine wheel 121' mounted on the main shaft 122. Rearwardly of the turbine there is an expansion chamber and air conduit 123 leading directly into a heat exchanger 124. The air forced into the air inlet by forward motion of the housing 120 at high velocity in the direction of the arrow A drives the expansion turbine at high speed, and in so doing loses its kinetic energy to such an extent as to cause substantial cooling of the air rearwardly of the turbine. The cool air passes around the tubes 125 of the heat exchanger 124 in a circuitous path and then passes out of the heat exchanger through the conduit 126. The latter conduit extends to a two-position selector valve 127, comprising a circular casing 128 having a rotatable valve body 129 mounted therein on a central shaft or pivot 130. With the valve body in the position shown, the air entering the valve from the conduit 126 is free to flow into the conduit 131 extending to the inlet side of air compressor 132. The compressor includes an impeller 133 secured on shaft 122 and driven thereby. The rearward end of shaft 122 is journaled in a central support 134 mounted in the compressor inlet. The impeller discharges air into the manifold 135 from which it is free to flow tangentially into a conduit 136 which returns the compressed air to the valve 127, and thence to the discharge conduit 137 having a discharge nozzle 137' at the rearward end thereof. As in the apparatus of Fig. 2 or Fig. 3 the cross sectional area of the discharge nozzle may be varied by means of a centrally located adjustable bullet member, the position of which may be changed by means of a servomotor 57. By regulating the discharge nozzle the back pressure on the expansion turbine 121 may be regulated, and the rotative speed thereof may be governed accordingly to govern the speed of the air compressor 132 and the pressure developed thereby.

Positioned to receive air by the ram effect of an inlet portion 138', is a low pressure air line 138 extending to the valve 127 and communicating with the conduit 139. The latter conduit opens into the manifold 140 of heat exchanger 124, by which the air reaches the tubes 125 extending into another manifold 141. The two manifolds 140 and 141 are connected by a bypass conduit 142, having a flow control valve 142' mounted therein. With the latter valve open as shown, the ram compressed air from conduit 139 is all bypassed from the manifold 140 to the manifold 141 and thence by conduit 143 to the aircraft cabin 1. It may be desirable in some installations to mount an air heater 144 in the cabin duct 143 to provide for very substantial heating of the air at high altitudes or in cold climates. The heater 144 may take any desired form, such as electrically heated grids mounted in the air stream or surface combustion units mounted in the air stream as found on some types of automobile heaters. Regulation of the cabin air pressure and volume may also be regulated by means of a throttle valve 143' mounted in the cabin air duct 143. The proportioning of cold and warm air to the cabin duct is accomplished by the relative setting of the throttle valves 140' and 142', and the setting is automatically governed by the reversible servomotor 68 connected by leads 69 to the cabin thermostat 70 exactly like the thermostat 70 described in connection with Fig. 2. Thus if the cabin 1 becomes too warm, the thermostat will act to open valve 140' partly and close valve 142' through the cable and pulley control means illustrated. Now air from the conduit 139 will flow through the heat exchanger tubes 125 and give up heat to the cold tubes, so that upon reaching the manifold 141 and cabin duct 143 the air will be cooler than before entering the heat exchanger. Neglecting the heater 144, any heat in the cabin conditioning air will come as a result of compression of the air ahead of the ram inlet 138', and while this will not be very important the heat so produced may be appreciable at high forward speeds. However the heat of compression in the air leaving the compressor 132 will be more important for cabinet heating when the selector valve 127 is turned to its other position, shown in dotted lines. In the position of the valve 127 as shown in solid lines, this heat of compression is important in increasing the expansion of air leaving the compressor 132 and causes increased reaction effect in driving the aircraft by the free flow of expanded air from the exhaust nozzle 137'. It should be noted that the solid line setting of valve 127 results in very moderate cabin pressurizing, because only the compressive effect of ram inlet 138' is available for compressing the cabin air supply. However if the cabin pressure should rise above the allowable limit, the relief valve 13 is always ready to open and release the excessive pressure to the outside atmosphere.

Considering now the plan of operation with the valve 127 set in the second or dotted line position, it will be seen that the air leaving the heat exchanger by way of conduit 126 is directed through valve 127 to the discharge conduit 137 and thence flows from the discharge nozzle 137' to augment the thrust on the aircraft and assist the propulsion apparatus thereof in driving the aircraft through the surrounding atmosphere. The cabin conditioning air still originates at the ram inlet 138' but now passes first to the air compressor inlet by way of the conduit 138, valve 127 and conduit 131. After being compressed in the compressor 132 the cabin air passes through conduit 136, valve 127 and conduit 139 to the heat exchanger 124. From the manifold 140 the compressed air is passed through the tubes 125 or conduit 142 to the manifold 141, conduit 143, heater 144, valve 143' and thus to the cabin 1 or other compartment to be air conditioned. In the dotted line setting of valve member 129 there is a minimum of thrust augmentation but a maximum of cabin pressurizing. In other words this second position of the selector valve is especially suited for high altitude cabin conditioning. At high altitudes the additional pressure produced by the compressor 132 is adapted to maintain normal cabin pressure and also the heat of compression is available to warm the cabin. If this compressor-induced heat is not sufficient, then the heater 144 may also be turned on either by manual means or by an automatic thermostatic control tied in with the main thermostat 70. Of course the proportioning valves 140' and 142' operate as explained before to give the desirable proportions of cold and warm air in the cabin conditioning air flow.

In the preceding description it was assumed for purposes of explanation that the apparatus is to be used to air condition an aircraft cabin. However other units or compartments in an aircraft may be cooled, heated and pressurized in exactly the same manner. The present apparatus is intended for general application insofar as feasible.

While the apparatus shown is not illustrated in the most compact forms possible, it is understood that in use the apparatus would be built into a unitary housing preferably for mounting within the aircraft fuselage or wing structures to eliminate unnecessary air drag. For purposes of illustration Figs. 1 to 4 show two possible forms of heat exchanger for cooling the cabin air supply. Other forms may be substituted according to choice or availability. Instead of using helically wound cooling coils as in Figs. 1 to 3 it may be preferable to employ spiral coils for better distribution of the cooling medium flowing around the coils.

The embodiments of the invention herein shown and described are to be regarded as illustrative only and it is to be understood that the invention is susceptible to variations, modifications and changes within the scope of the appended claims.

I claim:

1. In an air conditioning apparatus for use on high speed aircraft, means providing a forwardly-opening air inlet and chamber to receive atomspheric air for ram compression thereof within said chamber and rearwardly of said inlet, an expansion turbine adapted to be driven by said ram-compressed air and to simultaneously extract kinetic energy from said air and thus cool said air, a heat exchanger to receive the cool air from said turbine and permit its flow around the cooling tubes of the heat exchanger, a rearwardly-opening nozzle to discharge the air passing from said heat exchanger and utilize the flow thereof for thrust effort on said aircraft, means providing another source of compressed air including an air compressor driven through a common shaft by said expansion turbine, means to conduct the air from said other source of compressed air to the cooling tubes of said heat exchanger and directly to the aircraft cabin or other space to be air conditioned, means to proportion the relative amounts of air conducted to said cooling tubes and directly to said cabin, and means to conduct the compressed air flowing from said cooling tubes to the aircraft cabin or other space to be air conditioned.

2. In an air conditioning apparatus for use on high speed aircraft as recited in claim 1, wherein said means to proportion the relative amounts of air from said other source of compressed air to said cooling tubes and directly to said cabin comprises a pair of valves having interconnected valve actuators, a reversible motor for operating said interconnected valve actuators, and a thermostatic switch located in said cabin for connecting a power source to said servomotor for operation in the proper direction to control the cabin air temperature within predetermined limits.

3. In an air conditioning apparatus for use on high speed aircraft as recited in claim 1, means to vary the cross sectional area of said rearwardly-opening discharge nozzle to vary the back pressure on said expansion turbine and thus regulate the rotative speed of said turbine and said air compressor.

4. In an air conditioning apparatus for use on high speed aircraft, means providing a forwardly-opening air inlet and chamber to receive atmospheric air for ram compression thereof within said chamber and rearwardly of said inlet, an expansion turbine adapted to be driven by said ram-compressed air and to simultaneously extract kinetic energy from said air and thus cool said air, a heat exchanger to receive the cool air from said turbine and permit its flow around the cooling tubes of the heat exchanger, a rearwardly-opening nozzle to discharge the air passing from said heat exchanger and utilize the flow thereof for thrust effort on said aircraft, a compressor driven by said expansion turbine for providing a high-pressure air source, a second forwardly-opening air inlet and chamber to receive atmospheric air for ram compression thereof within said chamber and rearwardly of said inlet for providing a low-pressure air source, a second rearwardly-opening nozzle to discharge the air from said high-pressure air source or from said low-pressure air source, a selector valve capable of being set in one position to connect said high-pressure air source to said second rearwardly-opening nozzle and simultaneously connect said low-pressure air source to the cooling tubes of said heat exchanger and capable of being set in another position to connect said high-pressure air source to the cooling tubes of said heat exchanger and simultaneously connect said low-pressure air source to said second rearwardly-opening nozzle, and means to conduct the compressed air flowing from said cooling tubes to the aircraft cabin or other space to be air conditioned.

5. In an air conditioning apparatus for use on high speed aircraft, means providing a forwardly-opening air inlet and chamber to receive atmospheric air for ram compression thereof within said chamber and rearwardly of said inlet, an expansion turbine adapted to be driven by said ram-compressed air and to simultaneously extract kinetic energy from said air and thus cool said air, a heat exchanger to receive the cool air from said turbine and permit its flow around the cooling tubes of the heat exchanger, a compressor driven by said expansion turbine for providing a high-pressure air source, a second forwardly-opening air inlet and chamber to receive atmospheric air for ram compression thereof within said chamber and rearwardly of said inlet for providing a low-pressure air source, a rearwardly-opening nozzle to discharge the air leaving said heat exchanger after passing around the cooling tubes thereof or to discharge the air from said high-pressure air source, a selector valve capable of being set in one position to connect said high-pressure air source to said rearwardly-opening nozzle, to connect the air leaving said heat exchanger after passing around the cooling tubes thereof to the inlet of said compressor and to connect said low-pressure air source to the cooling tubes of said heat exchanger and capable of being set in another position to connect said high-pressure air source to the cooling tubes of said heat exchanger, to connect the air leaving said heat exchanger after passing around the cooling tubes thereof to said rearwardly-opening nozzle and to connect said low-pressure air source to the inlet of said compressor, and means to conduct the compressed air flowing from said cooling tubes to the aircraft cabin or other space to be air conditioned.

ERNST R. G. ECKERT.

REFERENCES CITED

The following references are of record in the file of this patent:

UNITED STATES PATENTS

| Number | Name | Date |
| --- | --- | --- |
| 2,391,838 | Kleinhans | Dec. 25, 1945 |
| 2,453,923 | Mayo | Nov. 16, 1948 |